United States Patent [19]

Keldany

[11] Patent Number: 4,869,295
[45] Date of Patent: Sep. 26, 1989

[54] PROFILED PLASTIC BAND

[75] Inventor: Rachid Keldany, Maur, Switzerland

[73] Assignee: Ametex AG, Neiderurnen, Switzerland

[21] Appl. No.: 230,525

[22] Filed: Aug. 10, 1988

[30] Foreign Application Priority Data

Aug. 25, 1987 [CH] Switzerland .................... 3254/87

[51] Int. Cl.$^4$ .............................................. F16L 11/16
[52] U.S. Cl. .................................... 138/129; 138/122; 138/154
[58] Field of Search ............... 138/118, 129, 121, 122, 138/154; 428/192

[56] References Cited

U.S. PATENT DOCUMENTS

| | | |
|---|---|---|
| 2,739,089 | 3/1956 | Hazeltorn ............................ 138/129 |
| 3,199,541 | 8/1965 | Richitelli . | |
| 3,679,531 | 7/1972 | Wienand et al. . | |
| 4,209,043 | 6/1980 | Menzel ................................. 138/129 |
| 4,435,460 | 3/1984 | Menzel ................................. 138/129 |
| 4,566,496 | 1/1986 | Menzel et al. ...................... 138/129 |
| 4,687,690 | 8/1987 | Menzel ................................. 138/154 |

FOREIGN PATENT DOCUMENTS 1778201 5/1971 Fed. Rep. of Germany .

Primary Examiner—James E. Bryant, III
Attorney, Agent, or Firm—Laurence R. Brown; Alfred J. Mangels

[57] ABSTRACT

A profiled band that includes two longitudinal edges of which one is provided with a groove and a parallel extending rib is allocated to the other one, which mentioned parts form a locked seam when the band is wound to a pipe, which seam is mechanically held in its operational position. The band is specifically suitable for an in situ production of wound pipes having a helically extending seam.

9 Claims, 2 Drawing Sheets

PROFILED PLASTIC BAND

BACKGROUND OF THE INVENTION

1. Field of the Invention

The present invention relates to a profiled plastic band for the production of wound pipes having a helically extending seam, which band includes two parallel side edges each having one respective longitudinal flange of which one forms a web and the other includes a longitudinally extending groove such that in the wound condition of the pipe the grooves embraces a section of a web allocated thereto and inserted thereinto.

2. Description of the Prior Art

The production of plastic pipes by helically winding a plastic band of the kind described above is known and disclosed for instance in the U.S. Pat. No. 3 199 541 or the DE-PS No. 17 78 201.

One of the problems of pipes produced by such a procedure is the reliable locking of the seam, i.e. the maintaining of the seam lock in the desired operational position (also during operation, e.g. in the case of pressurized pipes).

It thus has been proposed to weld or glue the cooperating areas of the seam. Such solutions could, however not always satisfy the demands made, specifically regarding the sealing properties. This difficulty has been solved partly by complicated solutions such as, e.g. insertion of additional sealing members, which led, however, to new difficulties during welding.

A further solution has among other been proposed by the present applicant, according to which the mechanical locking of the seam has been secured by means of a separate closing band which engages over the mutually bordering edges of the band or edge flanges and is supported against further ribs of the band.

This solution is technically convincing, indeed, but involves a certain additional expenditure (the additional closing band).

SUMMARY OF THE INVENTION

It is, therefore, a general object of the invention to solve the existing problems by a structurally more simple and still safer design of the band to be wound.

A further object is to provide a profiled plastic band comprising a longitudinal rib extending on the surface of a band parallel to the web, which rib includes in its flank facing the web at least one longitudinally extending and laterally open recess; and comprising at lesat one lip which extends at and along a outer flank of the longitudinal flange which includes a groove that projects laterally therefrom and is intended to snap, in case of the web having been inserted into its corresponding groove at the wound condition of the completed tube, into the corresponding recess in said longitudinal rib, whereby the locked seam formed thereby is kept in its operational position.

Still a further object of the invention is to provide a profiled plastic band having a longitudinally extending bead at the bottom of a groove and a longitudinally extending recess in the face surface of the free end of a web for recept of such a bead.

Yet a further object of the invention is to provide a profiled plastic band having a bead at the bottom of a groove consisting of a material which in comparison with the material of the remainder of the band features a substantially higher elasticity or elastic deformability, such that upon insertion of a web into the groove it abuts elastically the borders of the groove in the face surface of the web to form a seal.

A further object is to provide a profiled plastic band comprising a lip including two flanks, of which the upper one which is intended to abut one side wall of a recess in a longitudinally extending rib, extends substantially parallel to the band surface, and the other one, which is intended to abut one area of the flank of the longitudinally extending rib, extends inclined relative to the band surface.

Still a further object is to provide a profiled plastic band having a longitudinally extending rib including an area of a flank to be abutted by a lip, which area consists of a material which features a higher elastic deformability in comparison with the remainder of the band material such that an inserted lip is pressed elastically against the side wall of a recess thereat, and simultaneously a seal is formed.

Yet a further object is to provide a profiled plastic band having a longitudinal flange including a groove, which flange includes two lips at its outer flank, and has a web and a longitudinal rib in which the flank of the longitudinal rib facing the web includes two longitudinally extending recesses allocated to the lips.

The embodied inventive profiled band does not only allow the closing of the seam, but also the additional safe locking thereof without the necessity of having additional structural members besides the band proper. The specific embodiments guarantee a safe sealing of the locked seam without any additional means.

In those embodiments which include parts of a material, which features a higher elastic deformability than the remainder of the band material the entire band is produced by coextruding different materials.

BRIEF DESCRIPTION OF THE DRAWINGS

The present invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
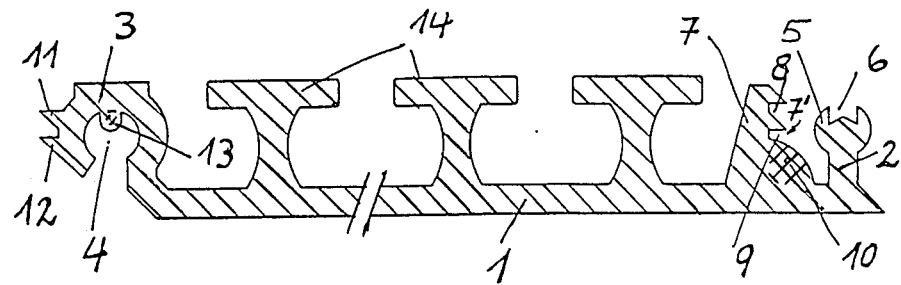
FIG. 1 is a cross-sectional view of a profiled plastic band structured in accordance with the present invention.
Figure 2:
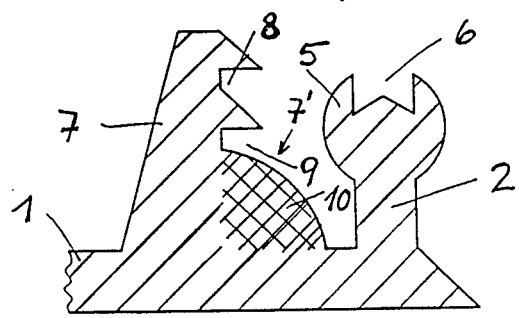
FIGS. 2 and 3 illustrate on an enlarged scale sectional views of the lateral longitudinal flanges for a more detailed illustration thereof.
Figure 3:
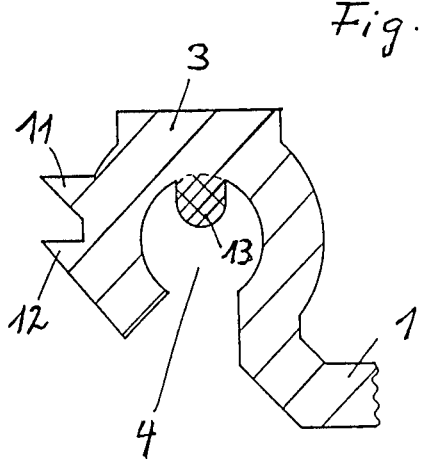

The profiled plastic band 1 illustrated in the drawing (FIG. 1) includes along one side edge a longitudinally extending web 2 and along the other side edge a groove 4 in a longitudinally extending flange 3, which groove 4 can be in the form of an undercut groove as shown, and is intended to enclose a part of an allocated or adjoining web 2 when the band 1 has been wound to a pipe.

At its upper free end the web 2 comprises an enlargement 5 having roughly a circular cross-sectional shape and being provided with a longitudinally extending groove 6. A longitudinal rib 7 extends parallel to the web 2 and includes on its flank 7' facing the web 2 two recesses 8,9 extending in a longitudinal direction and opening laterally.

The convexly bulged lower section 10 of the rib flank 7' consists of a material which in comparison with the remainder of the material of the band is substantially more elastic, i.e. features a substantially higher elasticity.

Two laterally projecting lips 11,12 are formed at the other longitudinal flange 3 having the groove 4 which corresponds generally regarding the cross-section to the enlargement of the web 2, which lips 11,12 fit into recesses 8,9 of a longitudinal rib 7. A longitudinally extending bead 13 is provided at the bottom of the groove 4 and is similar to the section 10 of the longitudinal rib 7 in that it consists of a material which is substantially softer and elastically more deformable than the remainder of the material of the band.

During production of band 1 the section 10 of the longitudinal rib 7 and the bead 13 in the flange 3 are produced by co-extrusion.

Between the two lateral longitudinal flanges 2 and 3 the band 1 includes at its upper side a row of further reinforcing ribs 14, of a e.g. T-shaped cross-section. The interstices between the ribs 14 of a manufactured pipe can be filled e.g. by a setting mass (mortar).

Figure 4:
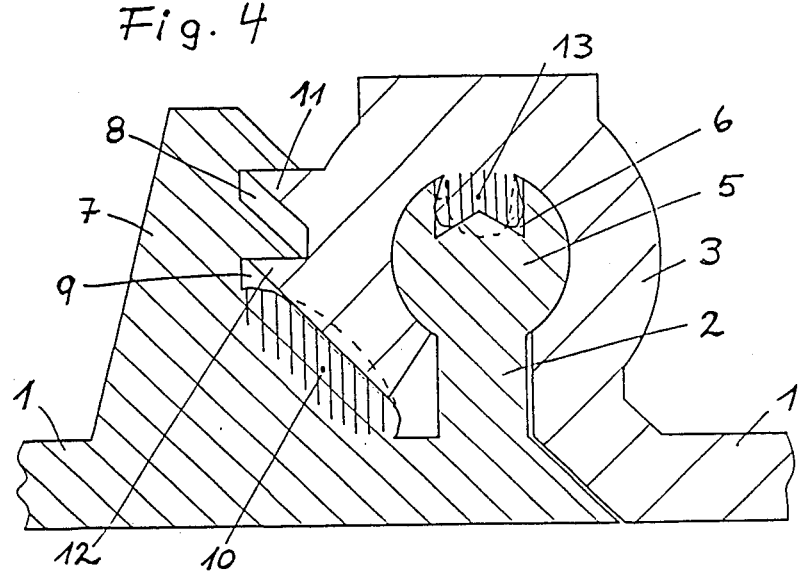
FIG. 4 is a cross-sectional view of the locked seam of a wound pipe, also on an enlarged scale.

FIG. 4 of the drawings illustrates the coperation between web 2, longitudinal flange 3 including groove 4, the longitudinal rib 7 including recesses 8,9 and the lips 11, 12, which snap into the recesses and maintain a locked seam in the operation position (e.g. when subject to pressure). The two longitudinal edges 2 and 3 of the band may also be welded or glued to each other (e.g. by ultrasonic welding).

FIG. 4 illustrates further how due to the parts 10 and 13 a sealing action is achieved which could not have been thought of by previous designs, because the parts 10 and 13 have been deformed upon the bringing together of the longitudinal edges. Further, by means of the elastically deformed part or section 10 of the longitudinal rib 7, the flange 3 or its lips 11,12, respectively, are pressed onto the allocated abutment surfaces in the recesses 8,9 and, accordingly, a safe locking of the edges is guaranteed. This renders a glueing, bonding or welding step superfluous and such a step is applied as an additional measure only.

Figure 5:
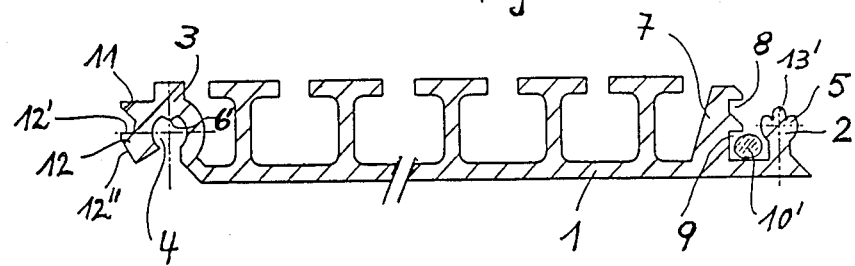
FIG. 5 is a view of an alternative embodiment of the inventive profiled band.

FIG. 5 illustrates a cross-section of an alternative embodiment of the inventive profiled band.

The plastic band 1 is designed basically in accordance with the band of FIGS. 1-4 and comprises specifically a web 2 having an enlargement 5 at one edge while at the other edge there is provided a longitudinal flange 3 having a groove 4.

The rib 7 includes at the flank 7' facing the web 2 also two laterally opening recesses 8,9 into which two lips 11,12 projecting from the web 2 can snap (when the seam is closed).

At the upper free end (face surface) of the web 2 a sealing ledge 13' of an elastic material is provided which in the closed state of the seam sealingly abuts the bottom of the groove 4. The sealing ledge 13' is preferably co-extruded together with the profile band. It also could be placed in a small recess or vulcanized thereupon.

In place of the elastic flank part 10 a longitudinally extending sealing member 10' is provided in the recess 9 which improves further the sealing property of the closed seam (it maintains the locking in its optimal position).

While there are shown and described present preferred embodiments of the invention, it is to be distinctly understood that the invention is not limited thereto, but may be otherwise variously embodied and practiced within the scope of the following claims.

I claim:

1. A profiled plastic band for the production of wound pipes having a helically extending seam, which band comprises: two parallel side edges each having a respective longitudinal flange, one flange defining a longitudinally extending web and the other flange defining a longitudinally extending groove, such that in the wound condition of a pipe the groove embraces a section of the web allocated thereto and inserted thereinto, a longitudinal rib extending parallel to said web, which rib includes a flank facing said web and spaced from the web, the flank including at least one longitudinally extending and laterally open recess; at least one lip extending laterally outwardly from and along the longitudinal flange which defines said groove, wherein when the web is inserted into the groove at the wound condition of the completed pipe, the lip extends into a corresponding recess in said longitudinal rib.

2. The profiled plastic band of claim 1, wherein the bulged portion is in the form of a convexly curved longitudinally extending member located between the bottom of said groove and a face surface of said web when a pipe is wound from the band and is connected to one of the bottom of said groove and the face surface of said web, said member formed from a material which in comparison with the remainder of the material of the band has a higer elastic deformability, such that upon said web having been inserted into said groove said member elastically abuts the web to form a seal therewith.

3. The profiled plastic band of claim 2, in which said longitudinally extending member is a longitudinally extending bead provided at the bottom of the groove and integral with the flange to extend into the groove.

4. The profiled plstic band of claim 2, in which a longitudinally extending bead of an elastic material is provided at the face surface of said web, such that upon said web having been inserted into said groove said bead elastically abuts the bottom of said groove to form a seal.

5. The profiled plastic band of claim 1, in which said lip includes two spaced flanks, one of which flanks abuts a side wall of said at least one recess in said longitudinally extending rib when the band is wound into a pipe, and the other flank abuts one wall of the longitudinally extending recess and extends in inclined relationship relative to the band surface to sealingly engage at least said one wall of the recess.

6. The profiled plastic band of claim 5, in which said bulged portion extending along the flank of said longitudinal rib and is formed from a material which in comparison with the remainder of the material of the band has a higher elastic deformability to contact and form a seal with an inserted lip that is positioned against a side wall of said recess.

7. The profiled plastic band of claim 3, in which said recess is in the form of an undercut groove.

8. The profiled plastic band of claim 1, in which two longitudinally extending lips are provided on the longitudinal flange which includes said groove, and in which two longitudinally extending recesses are provided in the longitudinal rib facing said web to receive respesctive ones of said lips.

9. The profiled plastic band of claim 6, in which said recess includes a convexly bulged lower section to deform upon insertion of a lip and to elastically abut against a flank of the lip.

* * * * *